June 18, 1929.  M. M. MOORE  1,717,617
SIGNAL
Filed May 11, 1927
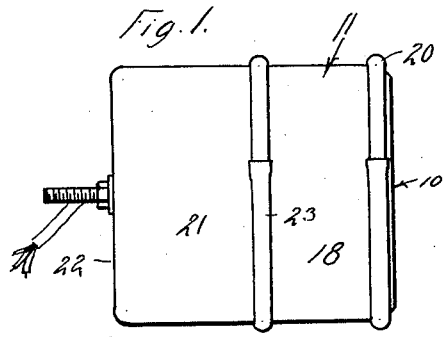
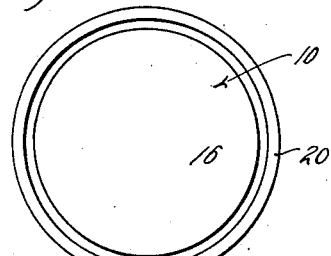
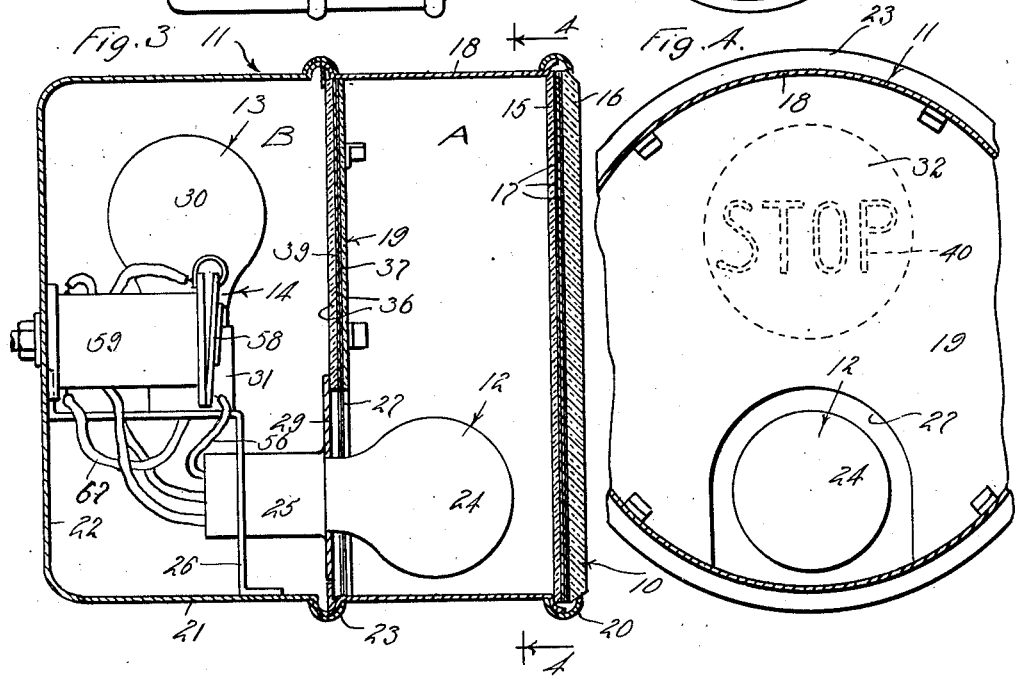
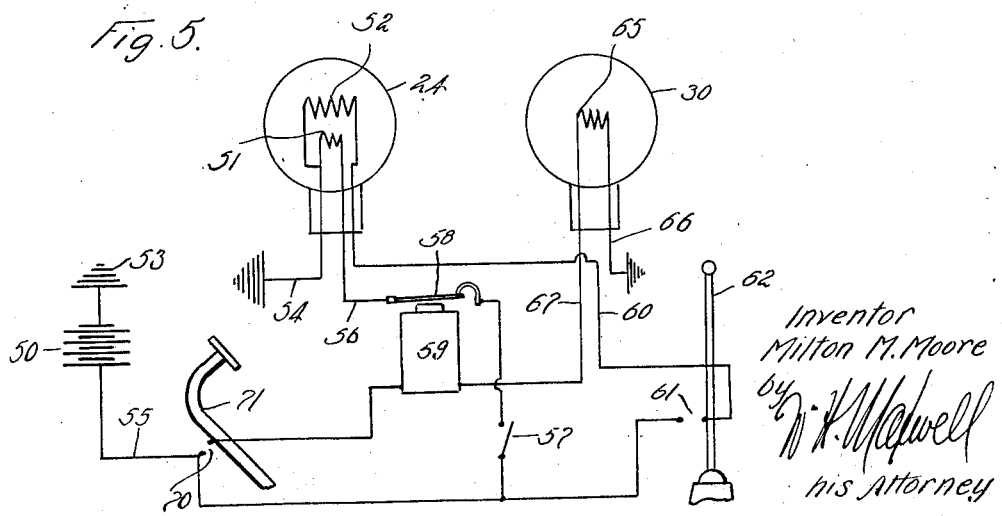
Inventor
Milton M. Moore
by
his Attorney Patented June 18, 1929.

1,717,617

UNITED STATES PATENT OFFICE.

MILTON M. MOORE, OF ALTADENA, CALIFORNIA, ASSIGNOR TO MARY AVERY SHERFEE, OF LOS ANGELES, CALIFORNIA.

SIGNAL.

Application filed May 11, 1927. Serial No. 190,466.

This invention has to do with a signal and it is an object of the invention to provide an effective, improved signal useful for various purposes.

My present invention provides, generally, a compact, sightly and effective signal whereby a plurality of signals of different colors are given from a single lens. The signal provided by this invention is readily applicable to many uses; for instance, it can be used to advantage in signalling equipment of railroad systems, in traffic signals, on vehicles, and in numerous other situations. The invention is particularly useful and practical as a vehicle signal and, therefore, I will describe a typical form and application of the invention suitable for use on a motor vehicle for the purpose of signaling to the operators of other vehicles. It is to be understood that this reference to the use of the invention is not to be construed as a restriction or limitation upon the broader principles of the invention.

It is a primary object of this invention to provide a signal having a single lens and means whereby the lens can be illuminated to appear in different colors.

It is another object of my invention to provide a signal having a lens with illuminating means for directing light through the lens so that the transmitted light is one color, and second illuminating means for directing light through the lens whereby the light transmitted by the lens is another color.

Another object of the invention is to provide features of construction and arrangement of parts for a device of the character mentioned to produce a compact, sightly, effective and inexpensive article of manufacture.

The various objects and features of the invention will be best and more fully understood from the following detailed description of a typical form and application of the invention, throughout which description reference is had to the accompanying drawings, in which:

Fig. 1 is a side elevation of a signal embodying my invention;

Fig. 2 is a front elevation of the signal;

Fig. 3 is a longitudinal, detailed, sectional view of the signal;

Fig. 4 is a transverse section of the signal, being a view taken as indicated by line 4—4 on Fig. 3; and Fig. 5 is an electrical diagram illustrating the control provided by this invention.

My present invention provides primarily a signal embodying a lens including light filtering means whereby light transmitted through it is predominantly one color, and illuminating means behind the lens for generating light to be transmitted through the lens so that the transmitted light is predominantly one color, and another or second illuminating means behind the lens for generating light to be transmitted through the lens, the color value of the light generated by the second illuminating means being different from that generated by the first illuminating means so that the light transmitted by the lens from the second illuminating means is of a color different from that transmitted from the first illuminating means.

The invention, that is, the principal elements constituting the invention, are capable of embodiment or incorporation in various constructions and arrangements. For the purpose of example, I will proceed with a detailed description of one typical arrangement and formation of the elements of the invention, from which description it is believed that the modifications of the invention will be apparent to those skilled in the art.

In the drawings, I have illustrated the signal as including a lens 10, a housing 11 carrying the lens 10 and forming two compartments A and B behind the lens, illuminating means 12 in the compartment A, illuminating means 13 in the compartment B, and suitable control means 14 for the illuminating means 12 and 13.

In accordance with my invention, the lens 10 is colored or provided with light filtering means whereby light transmitted through it is predominantly of one color. In carrying out my invention, the desired light filtering means may be combined or incorporated in the lens 10 in any suitable manner; for instance, the lens may be formed of glass, or the like, colored to have the desired light filtering action, or the lens may constitute a body of clear glass, or the like, having in combination with it a film of light filtering material. In the drawings, I have shown the lens of the last mentioned formation, in which case it includes two plates 15 and 16 of glass, or the like, between which is arranged the light filtering means. For purpose of example, the glass plates 15 and 16 may be considered clear glass while the light filtering means may be considered as one or more colored films such, for example, as colored gelatin films. In carrying out this form of construction, a single filter film 17 of the proper light filtering properties is sufficient to give the desired result. By obtaining the desired light filtering action through several light filtering films 17, adjustment or variation of shading in color can be obtained through removal or insertion of one or more of the films 17. In practice, I prefer to make the lens translucent; for instance, one of the plates of glass may have one side occupied by small round or prismatic projections.

The housing 11 shown in the drawings, is such that the compartment A is immediately behind the lens 10, while the compartment B is located behind the compartment A. In this case, the housing 11 includes a front section having a cylindrical body 18 closed at its rear end by a partition forming back 19. The lens 10 is adapted to be mounted at the forward end of the body 18 to close it. In the drawings, I have shown the lens 10 mounted at the front end of the body 18 through a suitable mounting ring 20.

The rear section of the housing includes a cylindrical body 21, which corresponds to and forms a rearward continuation of the body 18 of the front section. The rear end of the body 21 is closed by a back 22. The body parts 18 and 21 of the housing may be detachably connected through a suitable split ring 23. With the housing construction just described, the front compartment A is formed by the front section of the housing between the partition 19 and the lens 10, while the rear compartment B is formed by the rear section between the partition 19 and back 22.

The illuminating means 12, provided in the compartment A, may comprise an electric light bulb 24 carried in a suitable socket 25. In accordance with the preferred construction, the socket 25 is carried by a bracket 26 in the compartment B so that it faces the compartment A and registers with an opening 27 in the partition 19. The socket is arranged so that the bulb 24 mounted in it is within the compartment A, as clearly shown in Fig. 3 of the drawings. The opening 27 in the partition 19 is made sufficiently large to pass the bulb 24 so that the front section of the housing can be removed from the rear section with the bulb in place in the socket 25. A closure plate 29 projects from the socket 25 to engage the rear side of the partition 19 and close the opening 27 against the passage of light.

The illuminating means 13 provided in the compartment B may include an electric light bulb 30, carried in a socket 31 supported by the bracket 26. In accordance with the preferred arrangement, the sockets 25 and 31 are carried by the bracket 26 so that the bulbs 24 and 30 are spaced in diametrically opposite directions from the longitudinal center or axis of the device. With this arrangement, the bulb 24 is at one side, for instance, the lower side of the device, while the bulb 30 is at the opposite or upper side of the device.

In accordance with my invention, the partition 19 between the compartments A and B is opaque except at a part 32 substantially opposite the bulb 30, at which part it is adapted to transmit light and includes light filtering means so that the transmitted light is predominantly of one color. In the particular arrangement shown in the drawings, the partition is formed of two glass plates 36 between which is arranged a filter film 37. For purpose of example, I will refer to the plates 36 as being clear glass. The partition may be made opaque except at the portion or area 32 by providing a mat 39 of opaque material between the plates, which mat may be provided with an opening corresponding to the desired area or portion 32. In practice, the mat may be formed of paper, or any other suitable material that is substantially opaque. The desired light filtering means may be provided in the transparent portion of the partition by the insertion of the desired light filtering film 37 between the plates 36. With the arrangement just described, light from the bulb 30 passes through the transparent portion or area 32 of the partition to fall upon or illuminate the lens 10. It will be apparent that by properly spacing the bulb 30 behind the partition and by properly proportioning the transparent part 32 that light from the bulb will fully illuminate the lens 10. In accordance with my invention, suitable marks or devices, for instance, letters 40, may be provided on or in the partition 19 in the transparent portion 32 so that they are projected or cast upon the lens 10. The letters 40 may be painted or marked on the various parts of the partition so that they are opaque and, therefore, cast a shadow on the lens 10, or they may be formed or cut out of the filter film 37 so that they allow passage of light from the bulb 30 to the lens 10 without being filtered. For purpose of example, we will consider the letters 40 provided on the partition 10 in the last mentioned manner.

In accordance with my invention, various color combinations may be employed in carrying out the invention. For purpose of example, I will refer to the lens 10 as containing light filtering means whereby light from an ordinary electric light bulb 24 will be transmitted by the lens predominantly red. For example, in practice, I may provide purple and yellow filter films 17 in the lens balanced so that the light from the bulb 24, which contains a substantial amount of red, is transmitted through the lens 10 as a decidedly or predominantly red light. In this case, a green or blue-green filter film 37 embodied in the partition 19 will cause light transmitted through the lens 10 from the bulb 30 to be decidedly or predominantly green. Thus, by a suitable balance or relationship between the filter means in the lens 10 and partition 19, the lens will transmit light of one color when illuminated by the bulb 24 and will transmit light of a decidedly different color when illuminated by the bulb 30. It is to be understood that the particular color combination above mentioned is merely typical and given for purpose of example, as it will be obvious to those familiar with the filtration of light that an infinite number of color combinations can be obtained through suitably relating and balancing the light filter means.

The particular device disclosed in the drawings is designed and provided primarily as a light, for instance, a signal light, for use on the rear of a motor vehicle to act as a tail light, a backing up light, and as a warning light. For the purpose of a tail light, the bulb 24 is normally kept burning sufficiently to cause light to be transmitted through the lens 10 so that the light gives a red signal corresponding to the customary vehicle tail light. For the purpose of a backing up light, the bulb 24 may be operated to direct a strong light through the lens 10, causing a strong red light to shine from the device to give a substantial amount of illumination to the rear of the vehicle, enabling the driver to see a substantial distance to the rear of the vehicle. For the purpose of a warning or signal light, for instance, to indicate that the operator of the vehicle is about to stop, the bulb 30 may be operated, causing green light to be transmitted by the lens 10 in a manner to give other motorists a warning signal. With the particular construction above described, letters 40 may be cut out of the filter film 37 to form the word "Stop", in which case operation of the bulb 30 will cause the lens 10 to transmit green light except where light is transmitted through it directly from the bulb 30 through the letter openings in the filter 37 where it will transmit red light, thus giving a signal comprising the word "Stop" appearing in red in a field or background of green.

For the purpose of a signal of the character above mentioned, I provide a control system whereby the bulb 24 may normally operate to illuminate the lens 10 as a tail light, or may be operated to illuminate the lens 10 brightly as a backing up light, while the bulb 24 may be put out of operation and the bulb 30 into operation, illuminating the lens 10 to give the stop signal. The control system is illustrated in Fig. 5 of the drawings wherein 50 designates a battery or source of electrical energy. The bulb 24 in this case may be a two filament bulb including a small or low power filament 51 and a large or high power filament 52. In accordance with the practice ordinarily followed in wiring systems of this character, one pole of the battery 50 is grounded through a ground connection 53. One terminal of the filament 51 and one terminal of the filament 52 is connected to ground through a suitable ground connection 54. The other terminal of the filament 51 is connected with a main line 55 from the other pole of the battery 50 through a line 56 in which is connected a general control switch 57 and a solenoid operated switch 58. The switch 57 is normally closed and is adapted to be opened only upon energization of the solenoid 59. The switch 57 is a control switch which may be located at the instrument board of the vehicle so that the operator can conveniently control the operation of the filament 51. The second terminal of the large filament 52 is connected with the line 55 from the battery 50 by a line 60. A suitable control switch 61 is provided in the line 60 so that the circuit to the filament 52 can be closed. The switch 61 is preferably arranged in connection with the gear shift lever 62 of the vehicle so that the switch 61 is automatically closed upon the gear shift lever being arranged in position to engage the reverse gears of the vehicle. With this arrangement, the circuit to the large filament 52 is automatically closed upon the operator throwing the car into reverse gear. This operation not only gives a warning signal to those behind the vehicle, but also throws a strong light to the rear of the vehicle, enabling the operator to see a substantial distance behind the vehicle. The bulb 30 is provided with a filament 65 having one terminal connected with ground through a suitable ground connection 66 and the other terminal connected with the line 55 through a line 67. In accordance with my invention, the winding of the solenoid 59 is connected in series in the line 67 and a control switch 70 is provided in the line 67. The control switch 70 is preferably operatively connected with the brake pedal 71 of the vehicle so that it is automatically closed when the brake pedal 71 is operated. With this arrangement, the closing of the switch 70 through operation of the brake pedal 71 causes energization of the solenoid 59 so that the switch 58 is opened, thus opening the circuit to the small filament 51 from the bulb 24. When the switch 70 is closed, the circuit through the filament 65 is energized.

From the foregoing description, it is believed that the general principles and scheme of operation provided by the present invention will be fully understood. In the particular application of the invention above set forth, the lens 10 normally appears red and gives a red light suitable as a tail light when the small filament 51 of the bulb 24 is energized, and gives a bright red light suitable for backing up when the large filament 52 of the bulb is energized. A very effective and attractive stop warning signal is given when the filament 65 of the bulb 30 is energized, the warning or stop signal being red letters spelling "Stop" in a field or background of green. The tail light, or small filament 51, is thrown out of operation when the signal light is put into operation, as illumination by the filament 51 would materially interfere with or cut down the effectiveness of contrast of color obtained when the bulb 30 is in operation.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A signal including a lens, means for imparting a certain color to rays of light passing through any part of the lens, illuminating means, and means for changing the color of rays of light passing through predetermined portions of the lens.

2. A signal including a lens, means for imparting a certain color to rays of light passing through any part of the lens, two independently operable illuminating means, and means whereby operation of one of said illuminating means will effect a change in the color of rays of light passing through predetermined portions of the lens.

3. A signal including a lens, illuminating means, a color filter between the illuminating means and lens for imparting a certain color to rays of light passing through it and the lens, and means for changing the color of rays of light passing through predetermined portions of the filter and lens.

4. A signal including a lens having light filtering means, illuminating means for the lens, a second illuminating means, and means for simultaneously directing lights of different color values from the second illuminating means through different portions of the light filtering means of the lens.

5. A signal including a lens having light filtering means, illuminating means for the lens, a second illuminating means for the lens, means for simultaneously directing light of different color values from said second illuminating means through different portions of the light filtering means of the lens, and automatic control means whereby the first mentioned illuminating means is out of operation when the second illuminating means is in operation.

6. A signal including a housing, a lens at the front of the housing, a partition in the housing spaced behind the lens, a light in the housing in front of the partition, a light in the housing behind the partition, and light filtering means at the partition between the last mentioned light and the lens, there being marks on the light filtering means at the partition for the purpose specified.

7. A signal including a housing, a lens at the front of the housing, the lens embodying light filtering means whereby all rays of light passing through the lens will have a certain color, a partition in the housing spaced behind the lens, a light in the housing in front of the partition, a light in the housing behind the partition, and light filtering means at the partition between the last mentioned light and the lens adapted to effect change in the color of rays passing through predetermined portions of the lens when the light in rear of the partition is operative.

8. A signal including a housing, a lens at the front of the housing, means for imparting a certain color to all rays of light passing through the lens, an apertured partition in the housing spaced behind the lens, a light in the housing in front of the partition, a light in the housing behind the partition, and light filtering means adjacent the partition between the last mentioned light and the lens and adapted to effect change in color of rays of light passing through predetermined portions of the lens.

9. A signal including a housing provided with a light display opening, an illuminating means within the housing, means interposed between said illuminating means and the opening of the housing to impart a certain color to rays of light passing through the opening, and means within the housing for changing the color of rays of light passing through predetermined portions of said color imparting means.

10. A signal including a housing provided with a light display opening, an illuminating means within the housing, light filtering means betwen said illuminating means and the opening in the housing for imparting a certain color to rays of light passing through the opening, a second illuminating means, and means between the last said illuminating means and the light filtering means for changing the color of rays of light passing through predetermined portions of the light filtering means.

11. A signal comprising a housing provided with a light display opening, illuminating means within the housing, means for imparting a certain color to rays of the illuminating means passing through said opening, and means for changing the color of rays of light passing through predetermined portions of said color imparting means, for the purpose described.

In witness that I claim the foregoing I have hereunto subscribed my name this 7th day of May 1927.

MILTON M. MOORE.